United States Patent
Kuros et al.

(10) Patent No.: US 12,296,671 B2
(45) Date of Patent: May 13, 2025

(54) APPARATUS, SYSTEM, AND METHOD FOR REAR AXLE TORQUE LIMITING

(71) Applicant: CNH Industrial America LLC, New Holland, PA (US)

(72) Inventors: Pawel Kuros, Mt. Prospect, IL (US); Adam Abernethy, New Holland, PA (US); Michael Jensen, Lockport, IL (US)

(73) Assignee: CNH Industrial America LLC, New Holland, PA (US)

( * ) Notice: Subject to any disclaimer, the term of this patent is extended or adjusted under 35 U.S.C. 154(b) by 57 days.

(21) Appl. No.: 18/329,256

(22) Filed: Jun. 5, 2023

(65) Prior Publication Data

US 2024/0399859 A1    Dec. 5, 2024

(51) Int. Cl.
*B60K 23/08*    (2006.01)
*B60K 17/346*    (2006.01)

(52) U.S. Cl.
CPC ...... *B60K 23/0808* (2013.01); *B60K 17/3462* (2013.01)

(58) Field of Classification Search
CPC .................. B60K 23/0808; B60K 17/3462
USPC .......................................... 701/69
See application file for complete search history.

(56) References Cited

U.S. PATENT DOCUMENTS

| | | | |
|---|---|---|---|
| 6,209,673 B1 * | 4/2001 | Barlage | F16D 43/284 180/245 |
| 6,422,333 B1 | 7/2002 | Kjaer et al. | |
| 6,620,071 B1 * | 9/2003 | Cook | B60K 17/3462 475/221 |

(Continued)

FOREIGN PATENT DOCUMENTS

CN    108569168 B    7/2021

OTHER PUBLICATIONS

Jain, "Modelling of a rear axle Torque Vectoring Dual Clutch driveline for battery electric vehicles with verication in a virtual environment," Master's thesis in Automotive Engineering, Department of Mechanics and Maritime Sciences, Division of Vehicle Engineering and Autonomous Systems, Chalmers University of Technology, 2021.
Kim et al., "Development of Prediction Model for Axle Torque of Agricultural Tractors," Asabe Research, vol. 63(6), 1773-1786, ISSN 2151-0032 https://doi.org/10.13031/trans.14012.

(Continued)

*Primary Examiner* — Colby M Hansen
(74) *Attorney, Agent, or Firm* — Rickard K. DeMille; Rebecca L. Henkel; Peter K. Zacharias (57) ABSTRACT

Apparatuses, systems, and methods relate to limiting torque applied to a rear axle. A vehicle includes a frame, a front tractive assembly coupled to the frame, a rear tractive assembly coupled to the frame, a prime mover coupled to the frame, a front tractive sensor, an output sensor, and a controller. The front tractive assembly includes a front axle. The rear tractive assembly includes a rear axle. The prime mover drives the front tractive assembly and the rear tractive assembly to propel the vehicle. The front tractive sensor collects data indicating a front power usage. The output sensor collects data indicating a power output of the prime mover. The controller is communicatively coupled to the front tractive sensor, the output sensor, and the prime mover. The controller de-rates the prime mover when the power output equals a sum of the power threshold and the front power usage.

10 Claims, 6 Drawing Sheets

(56) References Cited

U.S. PATENT DOCUMENTS

| | | | |
|---|---|---|---|
| 6,697,725 B1* | 2/2004 | Williams | F16D 48/064 |
| | | | 701/81 |
| 6,862,511 B1 | 3/2005 | Phillips et al. | |
| 7,591,339 B2 | 9/2009 | Sugimoto et al. | |
| 7,816,874 B2 | 10/2010 | Matsuzaki et al. | |
| 8,825,314 B2 | 9/2014 | Jensen | |
| 8,972,136 B2 | 3/2015 | Yagi et al. | |
| 9,255,639 B2 | 2/2016 | Dueckinghaus et al. | |
| 9,290,176 B2 | 3/2016 | Yamashita | |
| 9,758,167 B1* | 9/2017 | Pandit | B60K 17/348 |
| 9,783,182 B2 | 10/2017 | Lee | |
| 2014/0039772 A1* | 2/2014 | Jensen | B60K 23/0808 |
| | | | 701/69 |

OTHER PUBLICATIONS

Kim et al., "Estimation of Axle Torque for an Agricultural Tractor Using an Artificial Neural Network," Sensors 2021, 21, 1989. https://doi.org/10.3390/s21061989.

Yang et al., "Research on Optimized Torque-Distribution Control Method for Front/Rear Axle Electric Wheel Loader," Hindawi, Mathematical Problems in Engineering, vol. 2017, Article ID 7076583, 12 pages, Published Sep. 10, 2017. https://doi.org/10.1155/2017/7076583.

\* cited by examiner

APPARATUS, SYSTEM, AND METHOD FOR REAR AXLE TORQUE LIMITING

BACKGROUND

The present disclosure relates generally to apparatuses, systems, and methods for regulating the power output in a vehicle. More specifically, the present disclosure relates to apparatuses, systems, and methods for de-rating an engine, prime mover, etc. to limit an input torque on a rear axle by measuring the torque applied to at least a front axle.

SUMMARY

One embodiment relates to a vehicle configured to limit torque applied to a rear axle. The vehicle includes a frame, a front tractive assembly coupled to the frame, a rear tractive assembly coupled to the frame, a prime mover coupled to the frame, a front tractive sensor, an output sensor, and a controller. The front tractive assembly includes a front axle. The rear tractive assembly includes a rear axle. The prime mover drives the front tractive assembly and the rear tractive assembly to propel the vehicle. The front tractive sensor collects data indicating a front power usage of the front tractive assembly. The output sensor collects data indicating a power output of the prime mover. The controller is communicatively coupled to the front tractive sensor, the output sensor, and the prime mover. The controller de-rates the prime mover at a power threshold in response to detecting a zero front power usage.

In some aspects, the controller allows the power output of the prime mover to increase above the power threshold in response to detecting a non-zero front power usage. The controller is further configured to de-rate the prime mover when the power output equals a sum of the power threshold and the non-zero front power usage.

In other embodiments, the vehicle includes an operator interface communicatively coupled to the controller. The operator interface is configured to send a defined range to the controller. The controller sends an alert to the operator interface in response to determining that the power output is within the defined range from the sum of the power threshold and the non-zero front power usage.

In further embodiments, the front tractive sensor is a torque sensor configured to measure a torque applied to the front axle.

In other embodiments, the output sensor measures an engine load, motor speed, and pressure.

In some embodiments, the vehicle also includes a power-take-off ("PTO") coupled to at least one of the prime mover, a transmission, or a transfer case. The vehicle also includes a PTO sensor configured to collect data indicating a PTO power usage. Additionally, the controller is communicatively coupled to the PTO sensor. The controller also de-rates the prime mover at the power threshold in response to detecting both the zero front power usage and a zero PTO power usage.

In further embodiments, the controller allows the power output of the prime mover to increase above the power threshold in response to detecting a non-zero front power usage or a non-zero PTO power usage. Additionally, the controller de-rates the prime mover when the power output equals a sum of the power threshold, the front power usage, and the PTO power usage.

In particular embodiments, the PTO sensor is a torque sensor configured to measure a torque applied to the PTO.

Another embodiment relates to a system for rear axle torque limiting. The system includes a prime mover, an output sensor, a front tractive sensor, and a controller. The output sensor collects data indicating a power output of the prime mover. The front tractive sensor collects data indicating a front power usage of a front tractive assembly. The controller includes one or more processing circuits, each processing circuit including a processor and a memory. The memory has instructions stored thereon that, when executed by the processor, cause the processing circuit to receive an indication of a power threshold, receive the data indicating the power output of the mover, receive the data indicating the front power usage, determine the power output of the prime mover, determine the front power usage, and de-rate the prime mover in response to determining that the power output equals a value defined by a sum of the power threshold and the front power usage.

In some embodiments, the system includes a PTO sensor. The PTO sensor collects data indicating a PTO power usage of a PTO. In such embodiments, the processing circuit de-rates the prime mover in response to determining that the power output equals a value defined by a sum of the power threshold, the front power usage, and the PTO power usage.

In additional embodiments, the system also includes an operator interface. The operator interface communicates a defined range to the controller. The processing circuit sends an alert to the operator interface in response to determining that the power output is within the defined range from the sum of the power threshold and the front power usage.

In some aspects, the alert includes an indication to increase the front power usage.

Still another embodiment relates to a method for rear axle torque limiting. The method includes receiving, at a controller, an indication of a power threshold, receiving, at the controller, data indicating a power output of a prime mover, receiving, at the controller, data indicating a front power usage of a front tractive assembly, determining the power output of the prime mover, determining the front power usage, and de-rating the prime mover when the power output equals a sum of the power threshold and the front power usage.

In some embodiments, the method includes receiving, at the controller, data indicating a PTO power usage of a PTO, determining the PTO power usage, and de-rating the prime mover when the power output equals a sum of the power threshold, the front power usage, and the PTO power usage.

In some embodiments, the method includes receiving, at the controller, a defined range, and, in response to determining that the power output is within the defined range from the sum of the power threshold and the front power usage, sending an alert to an operator interface.

In particular embodiments, the alert includes an indication to increase the front power usage.

In further embodiments, the controller receives the defined range from an operator via the operator interface.

In various embodiments, the power threshold is 400 horsepower.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle of the present disclosure includes a controller and sensors configured to regulate the power output of a prime mover to limit the torque received by a rear axle and/or rear tractive assembly of the vehicle. In this way, the vehicle is configured to protect the rear axle, rear tractive assembly, and/or components thereof from receiving excessive power or torque. In some embodiments, during operation, at least one sensor collects data indicating a power output of the prime mover and at least one sensor collects data indicating a front power usage of a front tractive assembly. The sensors may include torque sensors, speed sensors, force sensors, etc. and are used to correlate the torque received by a component of the vehicle with a power value associated with that component. In this way, the controller determines the power output of the prime mover, determines the power usage of at least the front tractive assembly, and de-rates the prime mover when the power output reaches the sum of a threshold power and the front power usage, which would result in damage or excess power being delivered to the rear axle and/or rear tractive assembly. For example, in some embodiments, the power threshold is 400 horsepower, indicating that the rear axle and/or rear tractive assembly should not receive 400 horsepower or greater. In such embodiments, the sensors collect data from the prime mover and the front tractive assembly. The controller receives the data and calculates a power output of the prime mover and a front power usage of the front tractive assembly and/or front axle. The controller de-rates the prime mover when the power output equals or exceeds the sum of the power threshold and the front power usage (e.g., when a power level equal to or greater than the power threshold is delivered to the rear axle and/or rear tractive assembly, when the rear axle/tractive assembly is receiving too much torque, etc.).

In another embodiment, during operation, at least one sensor collects data indicating a power output of the prime mover and at least one sensor collects data indicating a PTO power usage of a PTO. In such embodiments, the front tractive assembly may not be monitored via a sensor (e.g., in some embodiments, the power usage of the front tractive assembly is not monitored with a sensor, the prime mover is de-rated to protect the rear tractive assembly even if no sensor is monitoring the front tractive assembly, etc.). For example, in such embodiments, the system may include torque sensors, speed sensors, force sensors, etc. that are used to correlate the torque received by a component of the vehicle with a power value associated with that component. In this way, the controller determines the power output of the prime mover, determines the power usage of the PTO, and de-rates the prime mover when the power output reaches the sum of a threshold power and the PTO power usage, which may indicate that the rear tractive assembly is in danger of receiving excess power (e.g., at the rear axle). The system may determine that a power threshold is 400 horsepower or the power threshold may be set to 400 horsepower (or 500 horsepower, 350 horsepower, etc.). The system may monitor the sum of the power output of the prime mover and the power usage at the PTO. Upon determining that the sum of the power output of the prime mover and the power usage at the PTO meets or exceeds the power threshold, the system may de-rate the prime mover.

In other embodiments, at least one sensor also measures data indicating a PTO power usage of a PTO. The controller is configured to receive the power threshold and monitor the power output of the prime mover, the front power usage of the front tractive assembly and/or front axle, and the PTO power usage of the PTO. The controller de-rates the prime mover when the power output equals or exceeds the sum of the power threshold, the front power usage, and the PTO power usage (e.g., when a power level equals to or greater than the power threshold is delivered to the rear axle and/or rear tractive assembly, when the rear axle/tractive assembly is receiving too much torque, etc.).

In other embodiments, the controller is configured to send a warning to an operator interface of the vehicle when the rear axle is receiving or is within a defined range of receiving a specified torque/power level. In some aspects, the alert instructs an operator of the vehicle to divert power towards the front axle and/or front tractive assembly. In other aspects, the operator may enter the defined range to specify when the controller sends the alert.

Overall Vehicle

Figure 1:
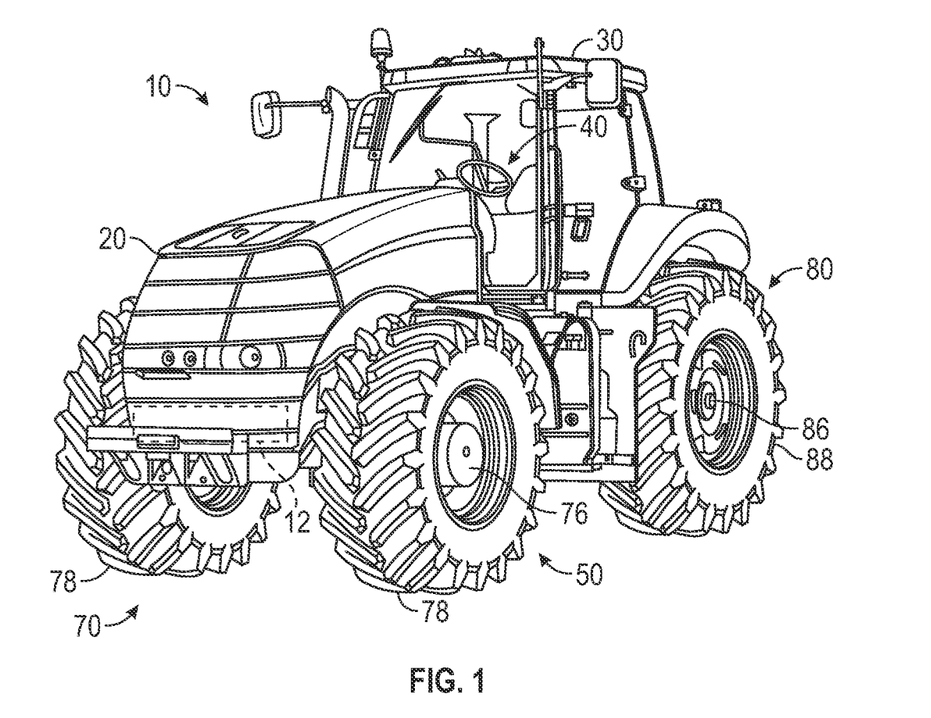
FIG. 1 is a perspective view of a vehicle, according to an exemplary embodiment.
Figure 2:
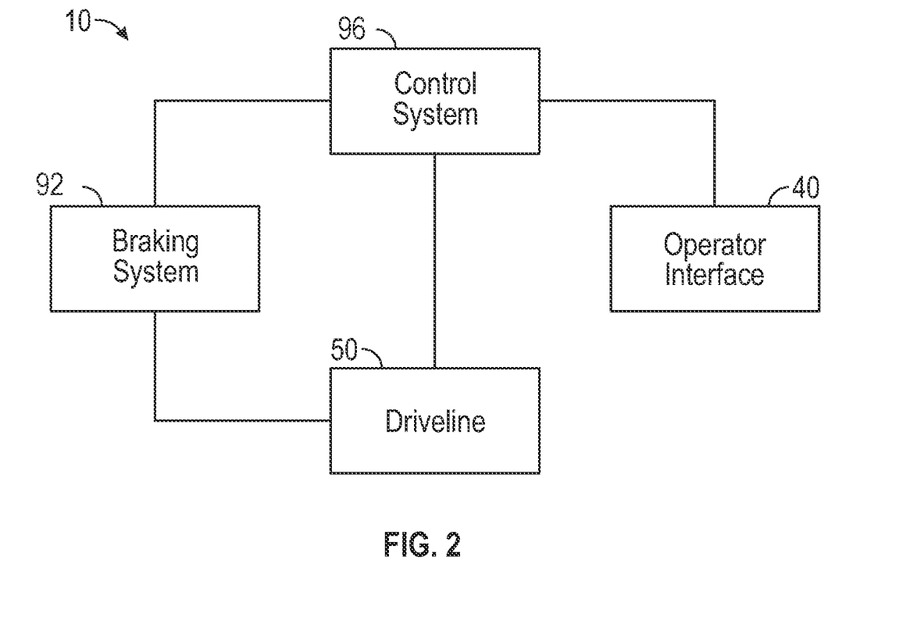
FIG. 2 is a schematic block diagram of the vehicle of FIG. 1, according to an exemplary embodiment.
Figure 3:
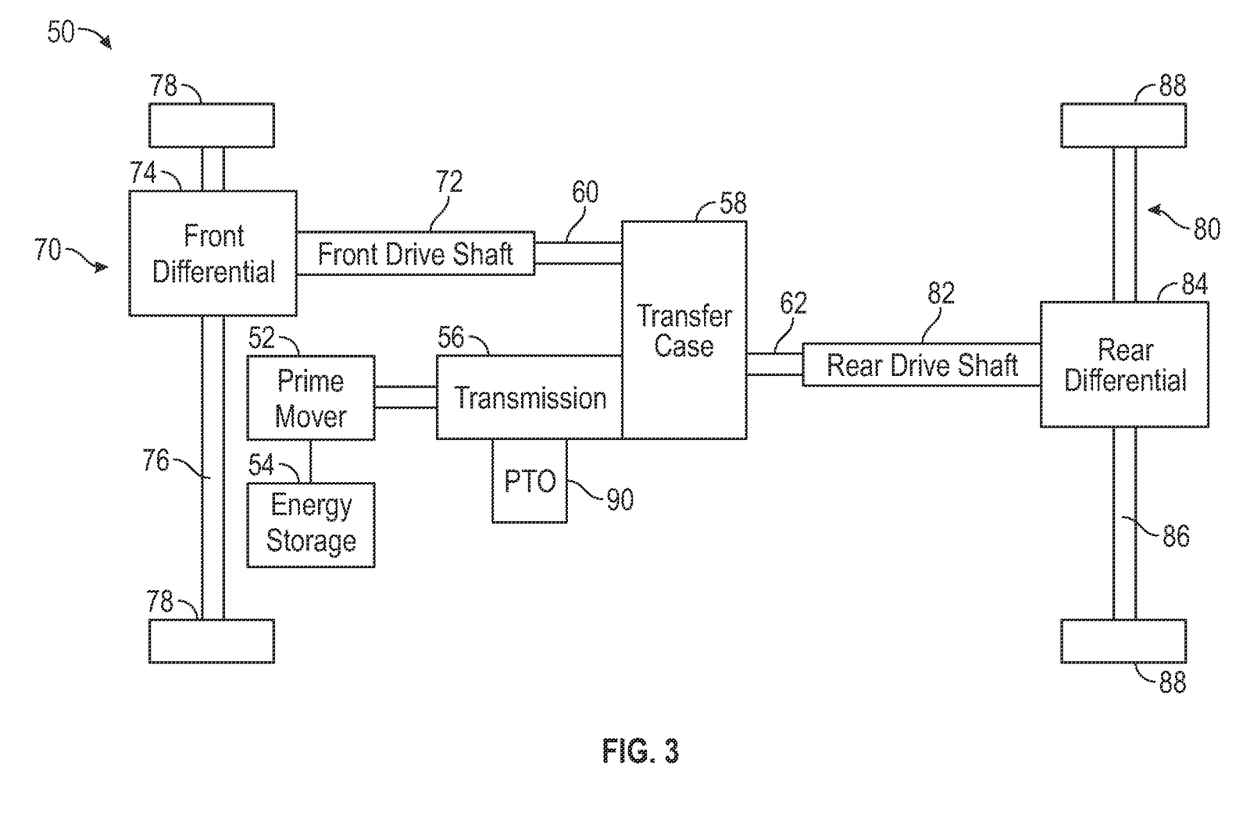
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 92, coupled to one or more components of the driveline 50 to facilitate selectively braking the one or more components of the driveline 50; and a vehicle control system, shown as control system 96, coupled to the operator interface 40, the driveline 50, and the braking system 92. In other embodiments, the vehicle 10 includes more or fewer components.

The chassis of the vehicle 10 may include a structural frame (e.g., the frame 12) formed from one or more frame members coupled to one another (e.g., as a weldment). Additionally or alternatively, the chassis may include a portion of the driveline 50. By way of example, a component of the driveline 50 (e.g., the transmission 56) may include a housing of sufficient thickness to provide the component with strength to support other components of the vehicle 10.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

In some embodiments, the system for rear axle torque limiting may operate independently from the cab 30 of the vehicle or the components, interfaces, and the like contained within the cab 30. For example, the system for rear axle torque limiting may be incorporated on a vehicle that has no cab 30 (e.g., does not have an onboard driver, driver interface, etc.). In other embodiments, the system for rear axle torque limiting may be co-functional with, integrated into, or interoperable with an autonomous operation system for an agricultural vehicle or for multiple agricultural vehicles. For example, a vehicle according to an exemplary embodiment may be configured to operate (e.g., harvest a crop, navigate a field, etc.) with little to no operator input. For example, an exemplary vehicle 10 may be controlled by computer software, a computer, algorithm, etc. working with sensors that allow the vehicle 10 to navigate a field and perform desired tasks (e.g., harvesting a crop) while identifying and avoiding obstacles, making decisions on pathing and speed, and regulating its movement with little to no human input. The system for rear axle torque limiting may allow the exemplary vehicle 10 to autonomously (e.g., without operator intervention) prevent the rear tractive assembly, rear axle, etc. from receiving input torque or power from the prime mover that exceeds the desired operating parameters of the rear tractive assembly. In other embodiments, the system for rear axle torque limiting may be essential for such autonomous operability to ensure that agricultural vehicles without operators directly overseeing their routine operation will not proceed in power modes that unduly stress or damage the components of the vehicle 10.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

In other embodiments, the driveline 50 may include two or more prime movers 52 coupled to a single transmission 56. The single transmission 56 may then feed power to the front tractive assembly 70 and the rear tractive assembly 80. In such embodiments, one or more sensors may be used to calculate the total (e.g., aggregate) power output of the two or more prime movers and treat this value as a single power output used to regulate the power received by the rear tractive assembly 80. For example, the system may be configured to de-rate the power of the prime mover 52 operating at the highest power level, de-rate the power of both prime movers 52 such that the power is de-rated as rapidly as possible, proportionally de-rate the power of the prime movers 52, or de-rate the power of the prime movers 52 in other manners to ensure that the rear tractive assembly 80 does not receive a torque or power input above its desired operating parameters. In other embodiments, sensors may be coupled to the components of the transmission to regulate and determine the power being fed to the front tractive assembly 70, PTO 90, etc.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 92 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 92 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one or more tractive elements (e.g., wheels, etc.) of the trailed implement.

Sensors for Limiting Rear Axle Torque Input

Figure 4:
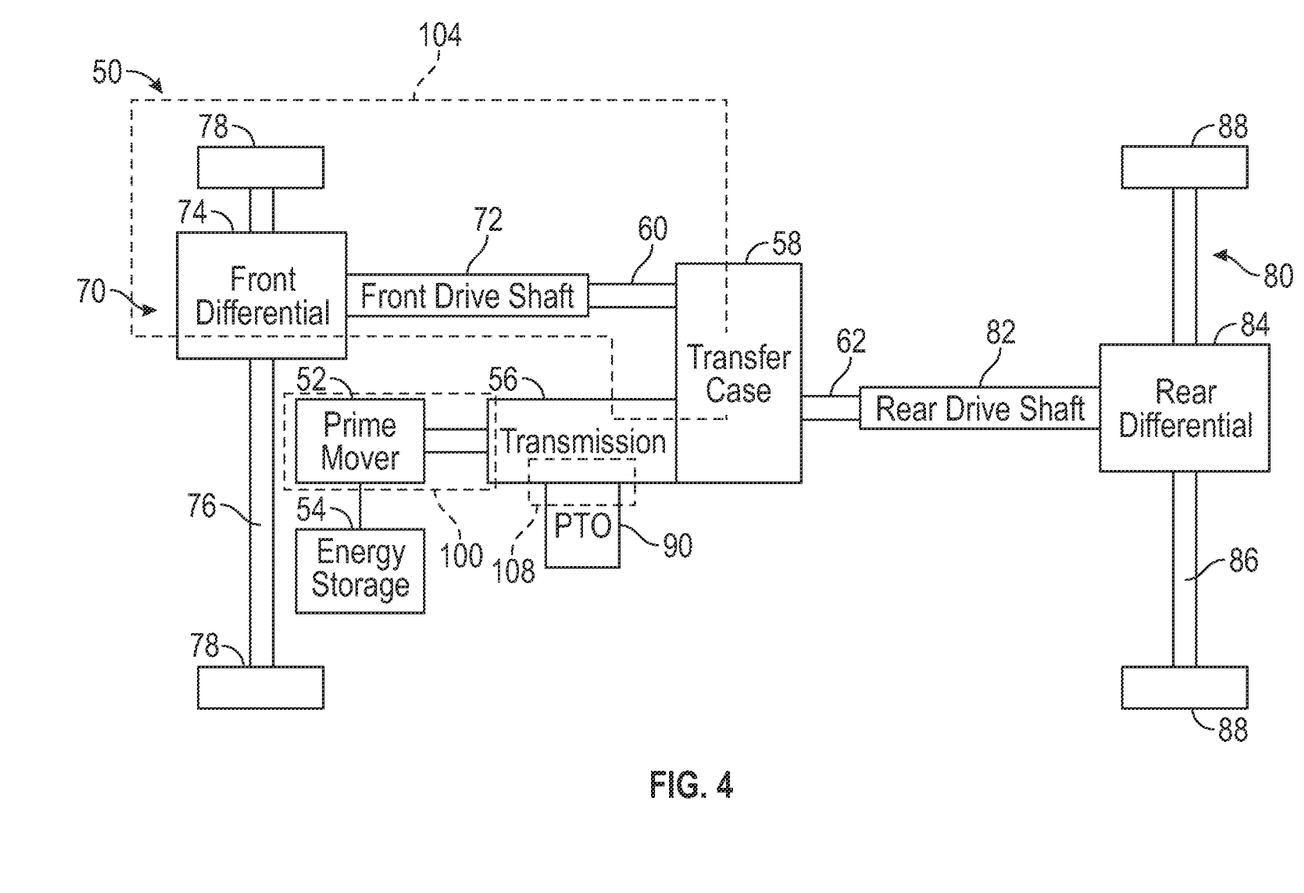
FIG. 4 is a schematic block diagram of the driveline FIG. 3 with exemplary locations of sensors, according to an exemplary embodiment.

As shown in FIG. 4, the vehicle 10, according to an exemplary embodiment, is equipped with at least one output sensor 100. The output sensor 100 is configured to collect data indicating a power output of the prime mover 52. In embodiments with multiple prime movers 52, multiple output sensors 100 may be used to collect data indicating an aggregate or per-prime-mover power output. For example, in some embodiments, the output sensor 100 includes a torque sensor (e.g., a torque transducer) configured to provide torque data generated by the prime mover 52. The output sensor 100 may also include sensors to detect the rotational speed (RPM) or motor speed of the prime mover 52. In other embodiments, the output sensor 100 includes sensors to detect a engine load or pressure. In some embodiments, the output sensor 100 is coupled to the prime mover 52. In other embodiments, one or more output sensors 100 are coupled to components of the transmission 56, or connectors between the prime mover 52 and transmission 56. For example, the output sensors 100 may include speed, torque, or load/force sensors coupled to the input shafts of the transmission 56 in order to measure data indicating a power output of the prime mover 52. Additionally, output sensors 100 may be coupled directly to or integral to the prime mover 52 (e.g., mass air flow sensor, fuel intake sensor, etc.).

The vehicle 10 also includes at least one front tractive sensor 104. The front tractive sensor 104 collects data indicating a front power usage of the front tractive assembly 70. For example, the front tractive sensor 104 may include sensors that calculate a torque, force, speed, etc. at the front tractive assembly 70. In this way, the front tractive sensor assists in calculating the output power of the prime mover 52 diverted to the front tractive assembly 70 and limiting the torque input received by the rear tractive assembly 80 and/or the rear axle 86. In some embodiments, the front tractive sensor 104 is configured to measure the torque applied to a shaft in the front tractive assembly 70 (e.g., a shaft of the front axle 79, front differential 74, front output 60, etc.). In such embodiments, the shaft may include a magnetized hollow portion that is more flexible than its surrounding components. As the shaft twists, the front tractive sensor 70 determines a torque applied to the front tractive assembly 70 based on the change in the magnetic field of the shaft. The front tractive sensor 104 may also measure a load or force on the front tractive assembly 70, a mass of the front axle 76, a speed of a component of the front tractive assembly (e.g., in RPM), or other data indicative of a front power usage of the front tractive assembly 104 or a component thereof (e.g., the front output 60, the front axle 79, etc.).

In some embodiments, particularly those where the vehicle includes a PTO 90, the vehicle 10 includes at least at least one PTO sensor 108 configured to collect data indicative of a PTO power usage of the PTO 90. As discussed above, the PTO 90 may be coupled to at least one of the prime mover 52, the transmission 56, or the transfer case 58, etc. As shown in the exemplary embodiment of FIG. 4, the PTO 90 is coupled to the transmission 56. At least one PTO sensor 108 is configured to collect data indicating a PTO power usage. The PTO sensor 108 may be coupled to a shaft or component of the PTO 90, a shaft or component of the transmission 56, or a component that indicates power input received that the PTO 90 (e.g., a connection supplying power from the prime mover 52 to the PTO 90). In some embodiments, the PTO sensor 108 collects data indicating torque applied to the PTO 90 or a component thereof (e.g., a torque sensor/transducer coupled to the PTO, etc.). The PTO sensor 108 may also measure a load or force on the PTO 90, a mass of the component of the PTO 90, a speed of a component of the PTO 90 (e.g., in RPM), or other data indicative of the PTO power usage or a component thereof (e.g., the front output 60, the front axle 79, etc.). In this way, the data collected by the PTO sensor 108 is used to monitor a power output of the prime mover 52 diverted to the PTO 90 and the components thereof.

Control System for Limiting Rear Axle Input Torque

Figure 5:
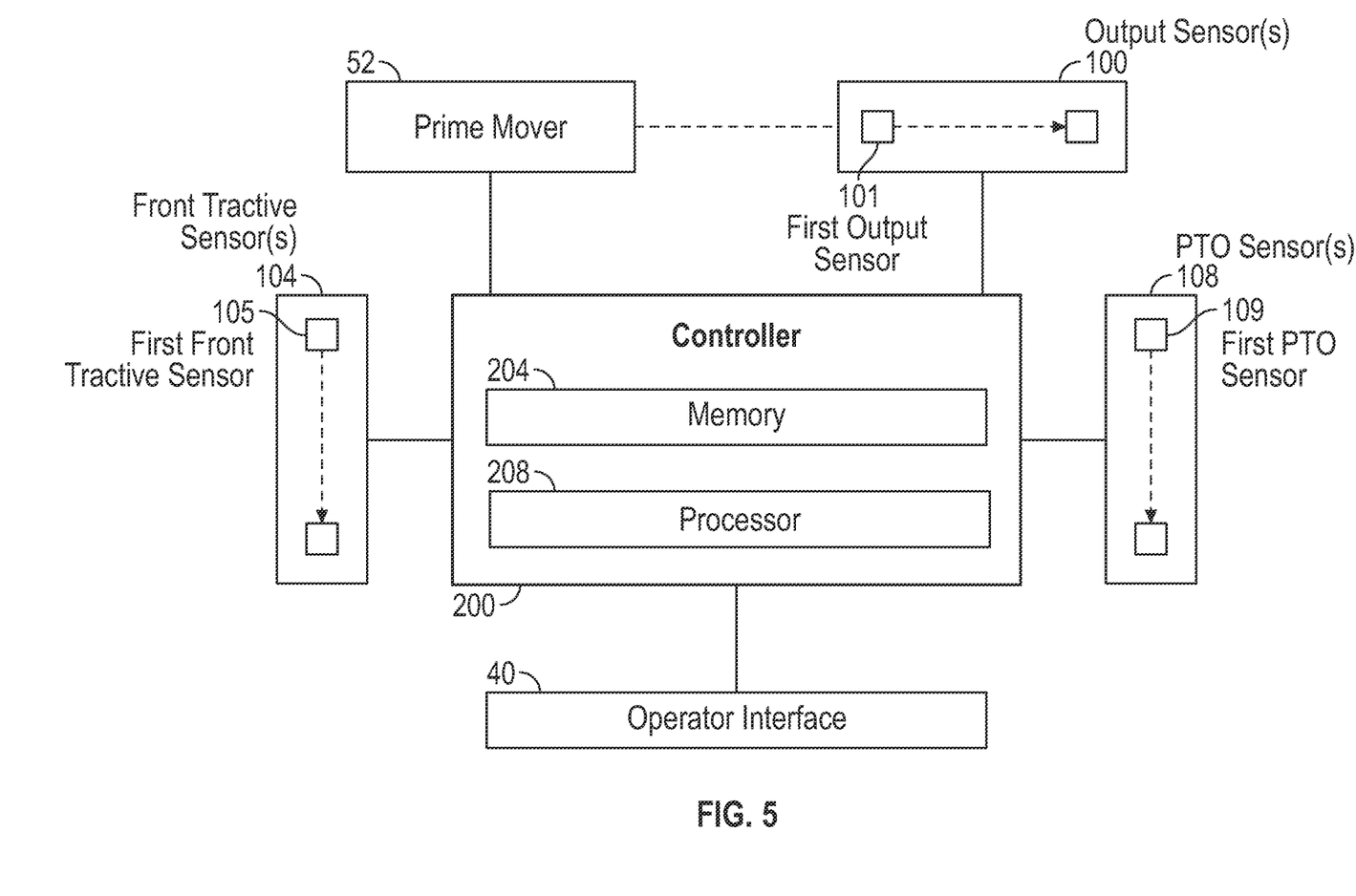
FIG. 5 is a schematic block diagram of a control system for limiting rear axle torque input, accordingly to an exemplary embodiment.

Turning to FIG. 5, the vehicle 10 also includes a controller 200 configured to facilitate rear axle torque limiting. The controller 200 includes a memory device, shown as memory 204 and processing circuitry (e.g., a processor 208). The processor 208 may be configured to execute one or more instructions stored on the memory 204 to perform one or more of the processes described herein. The controller 200 may be configured to receive information from one or more devices (e.g., a first output sensor 101, a first front tractive sensor 104, a first PTO sensor 109, operator interface 40, etc.) and/or to provide information (e.g., notifications, commands, alerts, etc.) to one or more devices (e.g., the prime mover 52, actuators, operator interface 40, etc.).

The controller 200 is communicatively coupled to the prime mover 52. The controller 200 may provide commands to the prime mover 52 (e.g., de-rate the prime mover 52, reduce speed of the prime mover 52, etc.). By way of example, the controller 200 may control the rotational speed, power output, fuel consumption, etc. of the prime mover 52. In one such example, the prime mover 52 is an engine, and the controller 200 provides commands that limit a rotational speed of the engine to a maximum speed.

The controller 200 is also communicatively coupled to the output sensor 100 and the front tractive sensor 104. In some embodiments, the controller 200 is also communicatively coupled to the PTO sensor 108. The controller 200 receives data indicative a power output of the prime mover 52 from the output sensor 100. Similarly, the controller 200 receives data indicative of a power usage from the front tractive sensor 104 and the PTO sensor 108. The controller utilizes data received from the prime mover 52, output sensor 100, front tractive sensor 104, PTO sensor 108, and/or operator interface 40 to determine a power output of the prime mover. The controller also utilizes such data to determine a power usage of the front tractive assembly 70 and/or PTO 90. The controller 200 may be a separate component or may be a component integrated or apart of the control system 96 of the vehicle 10. The controller 200 is communicatively coupled to the other devices of the control system 96. By way of example, the controller 200 may include a communication interface to facilitate communication with the other devices. In some embodiments, the devices of the controller 200 utilize wired communication (e.g., Ethernet, USB, serial, etc.). In some embodiments, the devices of the controller 200 utilize wireless communication (e.g., Bluetooth, Wi-Fi, Zigbee, cellular communication, satellite communication, etc.). The devices of the controller 200 may communicate over a network (e.g., a local area network, a wide area network, the Internet, a CAN bus, etc.).

In other embodiments, the vehicle 10 includes an operator interface 40 communicatively coupled to the controller 200. The operator interface 40 may be integral to the vehicle as shown in FIG. 2 (e.g., located inside the cab 30, coupled to the vehicle 10, etc.). Alternatively, the operator interfaces 40 may be portable and/or separable from the vehicle 10. For example, other operator interfaces 40 may include one or more user devices, such as smartphones, tables, laptops, desktops, pagers, or other user devices. By way of example, the operator interface 40 may include touch screens, buttons, steering wheels, pedals, levers, switches, knobs, keyboards, mice, microphones, and/or other input devices. The operator interface 40 may include one or more output devices configured to provide information to an operator (e.g., notifications, operating conditions, alerts, etc.). By way of example, the operator interface 40 may include screens, lights, speakers, haptic feedback devices, and/or other output devices. The operator interface 40 may require little to no human input and may be managed or interoperable with a system for autonomous operation of agricultural vehicles.

In this way, the controller 200 may be configured to receive commands that enable autonomously limiting rear axle torque input such that a vehicle or fleet of autonomously operating vehicles may operate without damaging the components of their drivelines 50.

The operator interface 40 may include one or more input devices configured to receive inputs (e.g., commands, desired power thresholds, torque/force tolerances, desired range of power before displaying warning) from an operator to facilitate operator control over the vehicle 10 configured to limit rear axle torque input. For example, in some embodiments, the operator interface 40 is configured to send a power threshold to the controller 200. The power threshold designates the maximum power the controller 200 will allow the vehicle to divert to the rear tractive assembly 80 and/or the rear axle 86. In other embodiments, the power threshold may be predesignated/predefined in the controller 200 (e.g., in the memory 204).

In other embodiments, the operator interface 40 may communicate a defined range to the controller 200. The defined range may be used to designate a power level, torque, force, etc. at which to alert the operator that the rear tractive assembly 80 and/or the rear axle 86 is approaching the power threshold (e.g., at a defined range of 10 horsepower, and a power threshold of 400 horsepower, alert the operator when 390 horsepower or more is diverted to the rear tractive assembly 80, etc.). The alert may indicate that the operator should divert power to the front tractive assembly 70, decrease speed of the prime mover 52, etc.

Operation and Method for Limiting Rear Axle Input Torque

During operation, the vehicle 10 varies the power output of the prime mover 52. For example, in some embodiments, operation of the vehicle 10 includes the prime mover 52 delivering power to drive the front tractive assembly 70, the rear tractive assembly 80, and the PTO 90. The front tractive assembly 70 may be designed to operate at higher power levels than the rear tractive assembly 80. The controller 200 and components of the vehicle 10 may accordingly implement the disclosed method to limit the power delivered to the rear tractive assembly 80 such that the power input to the rear tractive assembly 80 does not rise above a power threshold (e.g., a power level that would result in damage to the rear axle 86, a torque applied that would damage the rear tractive assembly 80, etc.). By designating a power threshold, determining the power output of the prime mover 52, and determining the power usage of the front tractive assembly 70 and/or the PTO power usage, the power delivered to the rear tractive assembly 80 can be calculated and/or limited such that it does not increase above the power threshold. Further, the power output of the prime mover 52 may be allowed to increase above the power threshold so long as power is being directed to the front tractive assembly 70 and/or the PTO 90 and the power received by the rear tractive assembly 80 does not rise above the power threshold.

Figure 6:
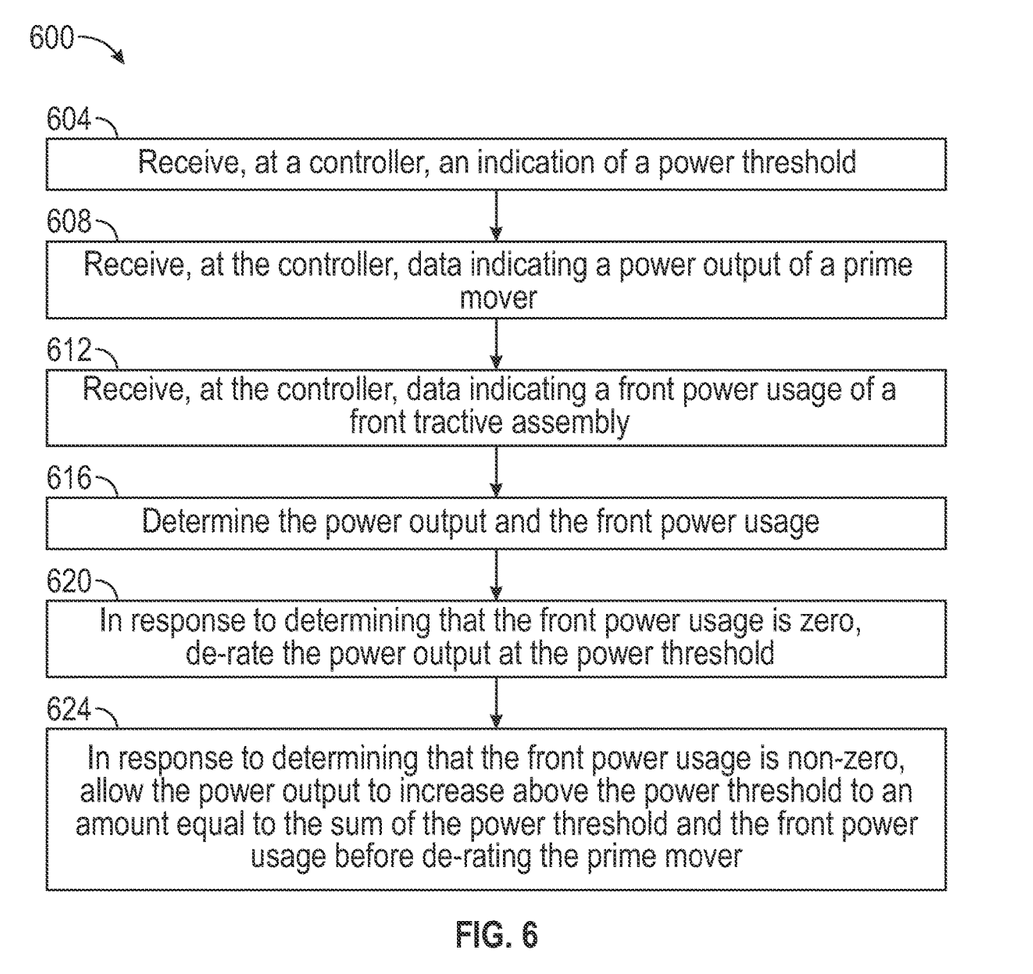
FIG. 6 is a schematic block diagram of a method for limiting rear axle torque input, accordingly to an exemplary embodiment.

Turning to FIG. 6, a method 600 for limiting rear axle torque input is shown. The method includes step 604, receiving, at a controller 200, an indication of a power threshold. For example, the controller 200 may be preprogrammed or preset to include a defined power threshold that the rear axle 86 should not exceed. In particular embodiments, the rear axle 86 is configured to receive no more than 400 horsepower. In other embodiments, the rear axle 86 is configured to receive no more than a specific toque, load, force. In further embodiments, the rear axle 86 is configured to rotate no more than a maximum speed. These predefined threshold values may be converted or correlated to a corresponding power threshold at the controller 200. In other embodiments, the power threshold may be received at the controller 200 via the operator interface 40 (e.g., at a control panel of the vehicle 10, via a mobile device, etc.). In further embodiments, the power threshold may be based on the size of the rear axle 86, the architecture of the rear tractive assembly 80, a component of the rear tractive assembly 80 most susceptible to damage/brakes at high loads/torque/power levels, etc.

The method 600 also includes step 608, receiving, at the controller 200, data indicating a power output of a prime mover 52. As discussed above, the controller 200 is communicatively coupled to at least one output sensor 100 configured to collect data indicative of a power output of the prime mover 52. The controller 200 receives this data from the output sensor 100. The controller may also receive data directly from the prime mover 52 (e.g., via output sensors 100 integral will the prime mover 52). In some embodiments, the controller 200 may receive data indicating a torque applied to an input shaft of the transmission 56 and a speed of the input shaft of the transmission 56. In other embodiments, the controller 200 may receive data such as an engine ECU load, a motor speed, a pressure at the prime mover 52 or a component of the transmission 56, a load/force applied to the transmission 56, etc.

The method 600 also includes step 612, receiving, at the controller, data indicating a front power usage of a front tractive assembly 70. The controller 200 is communicatively coupled to at least one front tractive sensor 104. For example, and as discussed above, the controller 200 may receive torque data at the front output 60, a speed of the front output 60, a force/torque/speed on the front axle 76, etc.

The method also includes step 616, determining the power output of the prime mover 52 and the front power usage of the front tractive assembly 70 (e.g., the power being diverted to the front tractive assembly 70 rather than the rear tractive assembly 80). For example, in some embodiments, output power of the prime mover 52 (e.g., input power to the transmission 56, etc.) is calculated by multiplying the speed and torque data received at the controller 200 from the output sensors 100. The controller 200 may also correlate data indicating an engine fuel intake, engine air intake, engine pressure, engine load, motor speed, etc. with a corresponding estimated or calculated power output of the prime mover 52.

Similarly, the controller 200 determines the front power usage of the front tractive assembly 70 (e.g., calculating power usage or power diverted to the front tractive assembly 70 based on the data collected by the front tractive sensor 104). For example, the controller 200 may receive data indicating a speed and torque applied to the front axle 79. The controller 200 may then multiply the speed and torque data to calculate/determine a power usage or power being diverted to the front tractive assembly 70, the front axle 76, etc.

At step 620 and step 624, the controller 200 is configured to de-rate the prime mover 52 when the power output of the prime mover equals a sum of the power threshold and the front power usage. By monitoring the power output and tracking power usage of the front tractive assembly 70 compared to the power threshold, the controller 200 can de-rate the prime mover 52 in order to prevent the power diverted to the rear tractive assembly 80 from increasing above the power threshold.

For example, at step 620, in response to determining that the front power usage is zero (e.g., no power is being diverted to the front tractive assembly 70, all power generated by the prime mover 52 is being transferred to the rear tractive assembly 80, etc.), the controller 200 de-rates the prime mover 52 when the power output of the prime mover 52 reaches the power threshold. For example, in some embodiments, the rear tractive assembly 80, the rear axle 86, etc. may be rated/configured to receive no more than 400 horsepower. Accordingly, the power threshold may be designated as 400 horsepower. In response to determining that the front tractive assembly 70 is receiving no power and that the power output of the prime mover 52 is 400 horsepower, the controller may determine that the rear tractive assembly 80 is receiving all 400 horsepower and is thus operating at its maximum designated power level. Accordingly, the controller 200 signals/communicates/commands the prime mover 52 to de-rate and not divert additional power to the rear tractive assembly 80.

At step 624, the controller 200 likewise monitors the power output of the prime mover 52 and ensures that the prime mover 52 de-rates to prevent the rear tractive assembly 80 from receiving an input power (or input torque, force, etc.) greater than that designated by the power threshold. At step 624, the controller 200 detects a non-zero front power usage (e.g., power is being diverted to the front tractive assembly 70). Accordingly, if the prime mover 52 were generating power equal to the power threshold, the rear tractive assembly 80 would receive power less than the power threshold because some of the power generated (e.g., the non-zero front power usage) is being diverted to the front tractive assembly 70. Thus, at this step, when the controller 200 detects a non-zero front power usage, the controller 200 is configured to allow the power output of the prime mover 52 to increase above the power threshold to an amount equal to the sum of the power threshold and the non-zero front power usage before de-rating the prime mover. In other words, when a non-zero front power usage is detected, the controller 200 allows the prime mover 52 to generate a power output equal to the power threshold plus the non-zero front power usage before de-rating the prime mover 52. For example, table 1 below illustrates exemplary operating parameters and conditions occurring at steps 620 and 624:

TABLE 1

| Threshold Power (hp) | Front Power Usage (hp) | De-Rate Prime Mover at Output Power (hp) |
| --- | --- | --- |
| 400 | 0 | 400 |
| 400 | 50 | 450 |
| 400 | 100 | 500 |

Figure 7:
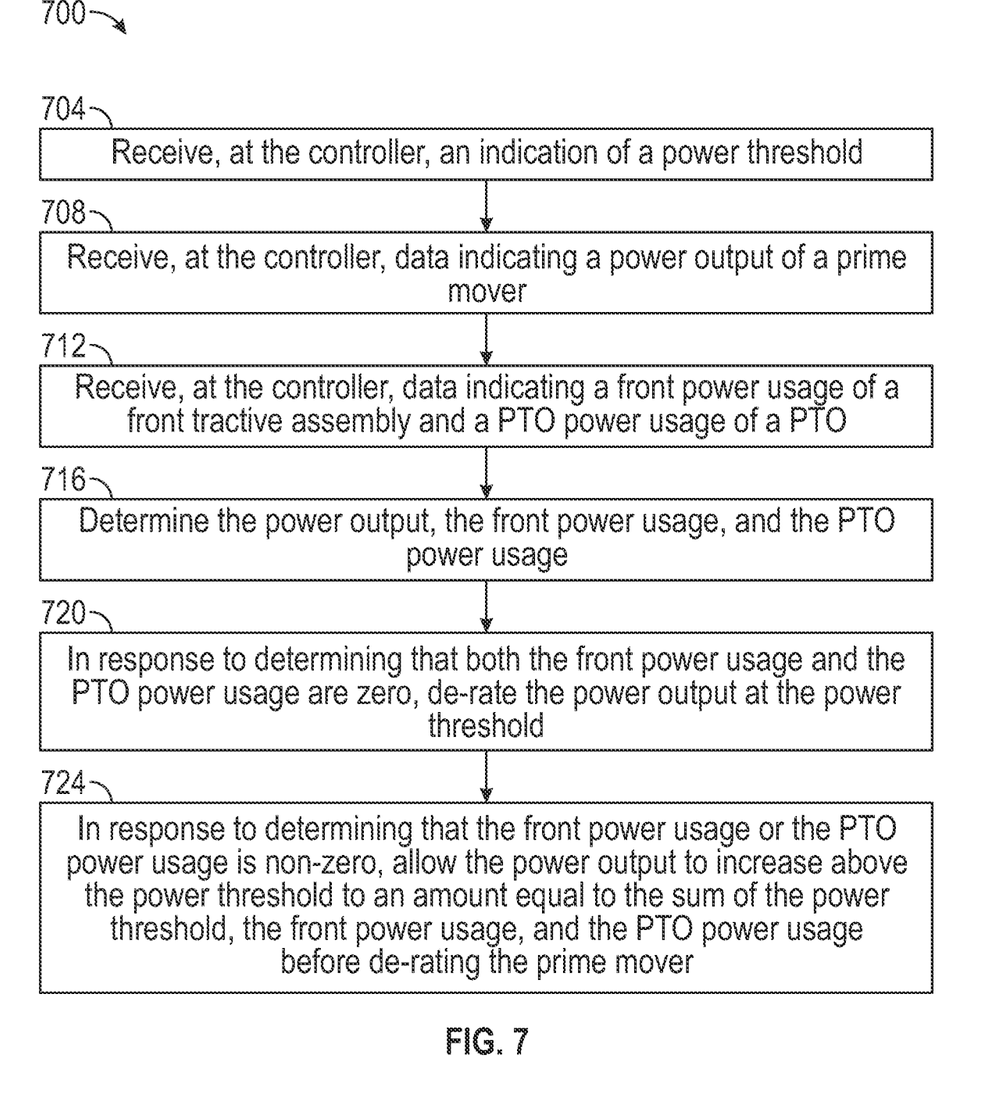
FIG. 7 is a schematic block diagram of a method for limiting rear axle torque input, according to an additional exemplary embodiment.

Turning to FIG. 7, in some embodiments, a method 700 of limiting rear axle torque also considers power being diverted to a PTO 90 or other additional components of the vehicle 10 (e.g., multiple PTOs, multiple front tractive assemblies 70, multiple components of a front tractive assembly 70, implements attached to the vehicle 10 and drawing power from the prime mover 52, etc.).

In method 700, steps 704 and 708 mirror steps 604 and 608 in method 600. For example, at step 704, a power threshold is designated to indicate a maximum amount of power to divert to a rear tractive assembly 80, a maximum torque that can be received by the rear axle 86, etc. Likewise, step 708 includes receiving, at the controller 200, data indicating a power output of a prime mover 52.

At step 712, the method 700 includes receiving, at the controller 200, data indicating a PTO power usage of a PTO 90 (e.g., data indicating power usage of an implement powered by the PTO 90, data correlated to power diverted to the PTO 90 or a component thereof). For example, the controller 200 may receive data indicating a speed and torque applied to a shaft of the PTO 90. The controller 200 also receive data indicating a speed, force, load, torque, pressure, etc. applied to an implement being driven by the PTO 90. Also at step 712, and like in step 612, the method 700 includes receiving, at the controller 200, data indicating a front power usage of a front tractive assembly 70. For example, and as discussed above, the controller 200 may receive torque data at the front output 60, a speed of the front output 60, a force/torque/speed on the front axle 76, etc.

At step 716, the method 700 includes determining the power output of the prime mover 52, the front power usage of the front tractive assembly 70 (e.g., the power being diverted to the front tractive assembly 70 rather than the rear tractive assembly 80), and the PTO power usage of the PTO 90 (e.g., calculating power usage of an implement powered by the PTO 90, determining power diverted to the PTO 90 or a component thereof, etc.). For example, in some embodiments, the output power of the prime mover 52 (e.g., input power to the transmission 56, etc.) is calculated by multiplying the speed and torque data received at the controller 200 from the output sensors 100. The controller 200 may also correlate data indicating an engine fuel intake, engine air intake, engine pressure, engine load, motor speed, etc. with a corresponding estimated or calculated power output of the prime mover 52. The controller 200 also determines the front power usage of the front tractive assembly 70 (e.g., calculating power usage or power diverted to the front tractive assembly 70 based on the data collected by the front tractive sensor 104). For example, the controller 200 may receive data indicating a speed and torque applied to the front axle 79. The controller 200 may then multiply the speed and torque data to calculate/determine a power usage or power being diverted to the front tractive assembly 70, the front axle 76, etc. Additionally, the controller 200 calculates the PTO power usage (e.g., the power output of the prime mover 52 being diverted to the PTO to drive an implement, turn a shaft, etc.). For example, the controller 200 may receive speed, torque, pressure, load, force, etc. data from a sensor mounted to an input shaft of the PTO 90 or an implement being powered by the PTO 90.

At step 720 and step 724, the controller 200 is configured to de-rate the prime mover 52 when the power output of the prime mover equals a sum of the power threshold, the front power usage, and the PTO power usage. By monitoring the power output and tracking power usage of the front tractive assembly 70 and PTO 90 compared to the power threshold, the controller 200 can de-rate the prime mover 52 in order to prevent the power diverted to the rear tractive assembly 80 from increasing above the power threshold.

For example, at step 720, in response to determining that both the front power usage is zero and that the PTO power usage is zero (e.g., no power is being diverted to the front tractive assembly 70 or the PTO 90, all power generated by the prime mover 52 is being transferred to the rear tractive assembly 80, etc.), the controller 200 de-rates the prime mover 52 when the power output of the prime mover 52 reaches the power threshold. For example, in some embodiments, the rear tractive assembly 80, the rear axle 86, etc. may be rated/configured to receive no more than 400 horsepower. Accordingly, the power threshold may be designated as 400 horsepower. In response to determining that the front tractive assembly 70 is receiving no power, that the PTO 90 is receiving no power, and that the power output of the prime mover 52 is 400 horsepower, the controller may determine that the rear tractive assembly 80 is receiving all 400 horsepower and is thus operating at its maximum designated power level. Accordingly, the controller 200 signals/communicates/commands the prime mover 52 to de-rate and not divert additional power to the rear tractive assembly 80.

At step 724, the controller 200 likewise monitors the power output of the prime mover 52 and ensures that the prime mover 52 de-rates to prevent the rear tractive assembly 80 from receiving an input power (or input torque, force, etc.) greater than that designated by the power threshold. At step 724, the controller 200 may detect (1) a non-zero front power usage (e.g., power is being diverted to the front tractive assembly 70), (2) a non-zero PTO power usage (e.g., power is being diverted to the PTO 90), or (3) both a non-zero front power usage and a non-zero PTO power usage (e.g., both the front tractive assembly 70 and the PTO 90 are receiving power from the prime mover 52). Accordingly, if the prime mover 52 were generating power equal to the power threshold, the rear tractive assembly 80 would receive power less than the power threshold because some of the power generated (e.g., the non-zero front power usage, the non-zero PTO power usage, or both) is being diverted to the front tractive assembly 70 and/or the PTO 90. Thus, at this step, when the controller 200 detects a non-zero front power usage and/or a non-zero PTO power usage, the controller 200 is configured to allow the power output of the prime mover 52 to increase above the power threshold to an amount equal to the sum of the power threshold, the front power usage, and the PTO power usage before de-rating the prime mover. In other words, when a non-zero front power usage is detected and/or a non-zero PTO power usage is detected, the controller 200 allows the prime mover 52 to generate a power output equal to the power threshold plus the non-zero front power usage and/or the non-zero PTO power usage before de-rating the prime mover 52. Table 2 below illustrates exemplary operating parameters and conditions occurring at steps 720 and 724:

TABLE 2

| Threshold Power (hp) | Front Power Usage (hp) | PTO Power Usage (hp) | De-Rate Prime Mover at Output Power (hp) |
|---|---|---|---|
| 400 | 0 | 0 | 400 |
| 400 | 50 | 0 | 450 |
| 400 | 0 | 50 | 450 |
| 400 | 50 | 50 | 500 |

In some embodiments, the method includes receiving, at the controller 200, a defined range. For example, an operator may input the defined range into the operator interface 40, a mobile device communicatively coupled to the controller, etc. In other embodiments, the defined range may be pre-programmed or predefined in the memory 204 of the controller 200. The defined range may be a power value, torque value, force measurement, etc. used to issue an alert or notify an operator. For example, the defined range may be set at 10 horsepower. In exemplary apparatuses, systems, and methods, in response to determining that the power output of the prime mover 52 is within the defined range (e.g., within 10 horsepower) from the sum of the power threshold, the front power usage, and/or the PTO power usage, the controller 200 sends an alert to an operator interface. The alert may indicate that the operator should increase the front power usage (e.g., the power diverted to the rear tractive assembly 80, the rear axle 86, etc. is approaching its maximum limit). The alert may also indicate that the operator should re-ballast or adjust the load of the vehicle 10 to decrease the load/torque on the rear tractive assembly 80. Table 3 below shows exemplary operating parameters utilizing a defined range:

TABLE 3

| Threshold Power (hp) | Front Power Usage (hp) | PTO Power Usage (hp) | Defined Range (hp) | Send Alert Message at Prime Mover Output Power (hp) | De-Rate Prime Mover at Output Power (hp) |
|---|---|---|---|---|---|
| 400 | 0 | 0 | 0 | 400 | 400 |
| 400 | 0 | 0 | 5 | 395 | 400 |
| 400 | 50 | 0 | 5 | 445 | 450 |
| 400 | 0 | 50 | 5 | 445 | 450 |
| 400 | 50 | 50 | 5 | 495 | 500 |

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the braking system 92, the control system 96, etc.) as shown in the various exemplary embodiments is illustrative only. Additionally, any element disclosed in one embodiment may be incorporated or utilized with any other embodiment disclosed herein.

What is claimed is:

1. A vehicle comprising:
 a frame;
 a front tractive assembly coupled to the frame, the front tractive assembly including a front axle;
 a rear tractive assembly coupled to the frame, the rear tractive assembly including a rear axle;
 a prime mover coupled to the frame and configured to drive the front tractive assembly and the rear tractive assembly to propel the vehicle;
 a front tractive sensor configured to collect data indicating a front power usage of the front tractive assembly;
 an output sensor configured to collect data indicating a power output of the prime mover; and
 a controller communicatively coupled to the front tractive sensor, the output sensor, and the prime mover, the controller configured to de-rate the prime mover at a power threshold in response to detecting a zero front power usage.

2. The vehicle of claim 1, wherein the controller is configured to allow the power output of the prime mover to increase above the power threshold in response to detecting the non-zero front power usage, and the controller is further configured to de-rate the prime mover when the power output of the prime mover equals a sum of the power threshold and the non-zero front power usage.

3. The vehicle of claim 2, further comprising:
 an operator interface communicatively coupled to the controller, the operator interface configured to send a defined range to the controller; and
 wherein the controller is further configured to send an alert to the operator interface in response to determining that the power output is within the defined range from the sum of the power threshold and the non-zero front power usage.

4. The vehicle of claim 2, wherein the power threshold is 400 horsepower.

5. The vehicle of claim 2, wherein the front tractive sensor is a torque sensor configured to measure a torque applied to the front axle.

6. The vehicle of claim 2, wherein the output sensor measures an engine load, motor speed, and pressure.

7. The vehicle of claim 1, further comprising:
- a PTO coupled to at least one of the prime mover, a transmission, or a transfer case;
- a PTO sensor configured to collect data indicating a PTO power usage; and
- wherein the controller is further communicatively coupled the PTO sensor, the controller further configured to de-rate the prime mover at the power threshold in response to detecting both the zero front power usage and a zero PTO power usage.

8. The vehicle of claim 7, wherein the controller is further configured to allow the power output of the prime mover to increase above the power threshold in response to detecting a non-zero front power usage or a non-zero PTO power usage, and the controller is further configured to de-rate the prime mover when the power output equals a sum of the power threshold, the front power usage, and the PTO power usage.

9. The vehicle of claim 8, wherein the power threshold is 400 horsepower.

10. The vehicle of claim 7, wherein the PTO sensor is a torque sensor configured to measure a torque applied to the PTO.

\* \* \* \* \*